(12) United States Patent
Xie

(10) Patent No.: US 7,466,338 B2
(45) Date of Patent: Dec. 16, 2008

(54) WIDE-ANGLED IMAGE DISPLAY SYSTEM FOR AUTOMOBILES

(76) Inventor: Yiling Xie, 900 Arcadia Ave., #8, Arcadia, CA (US) 91007

( * ) Notice: Subject to any disclaimer, the term of this patent is extended or adjusted under 35 U.S.C. 154(b) by 955 days.

(21) Appl. No.: 10/708,362

(22) Filed: Feb. 26, 2004

(65) Prior Publication Data

US 2005/0190260 A1 Sep. 1, 2005

(51) Int. Cl.
*H04N 7/18* (2006.01)
(52) U.S. Cl. ........................ 348/148; 348/143
(58) Field of Classification Search ............... 348/143, 348/148; 340/425.5, 463
See application file for complete search history.

(56) References Cited

U.S. PATENT DOCUMENTS

| | | | | |
|---|---|---|---|---|
| 6,476,855 B1 * | 11/2002 | Yamamoto | ............... | 348/148 |
| 6,509,832 B1 * | 1/2003 | Bauer et al. | ............... | 340/425.5 |
| 6,593,960 B1 * | 7/2003 | Sugimoto et al. | ........... | 348/148 |
| 6,693,524 B1 * | 2/2004 | Payne | ........................ | 340/463 |

* cited by examiner

*Primary Examiner*—Allen Wong
(74) *Attorney, Agent, or Firm*—Jen-Feng Lee, Esq.

(57) ABSTRACT

A wide-angled display system for automobiles incorporates the use of multiple cameras whose captured images are processed to produce an integrated view, as if viewed directly by human eyes. This integrated view avoids the blind spots inherent in the 3 rear view mirrors currently used. A pseudo-car image (PCI) program logic is described and claimed to transform images of large moving object into smaller objects taking up same length/volume, at the time the large object is approaching from behind, to correct driver misjudgment problem.

1 Claim, 5 Drawing Sheets

WIDE-ANGLED IMAGE DISPLAY SYSTEM FOR AUTOMOBILES

BACKGROUND OF INVENTION

The present invention relates generally to design and construction of a wide-angled image display system for use on automobiles.

Present invention solves at least two industry problems: the blind spots that a car driver cannot see and the incorrect evaluation of speed of other larger vehicles.

The use of multiple cameras for capturing separate images, which are views from the sides and back of driver's vehicle, and then feed into an image distribution system to generate an integrated wide-angled eliminates the blind spots.

A computer control unit, employing a program logic described herein, transforms large (seemingly slow-moving) object to several regular-sized automobile images, and thus avoid driver's illusion that a large vehicle is moving slowly, when in fact the large vehicle is moving or approaching very fast.

SUMMARY OF INVENTION

Visual illusions, especially in the case of large moving objects, often play tricks to human senses. For example, a large 747 jet approaching the landing strip in an airport with landing gear down always seems awfully slow; whereas a small propeller airplane seems to zoom by like a bullet when it is ready to land. Researches have shown that in the outside open space, people tend to judge speed of a moving object by the distance traveled relative to the length/size of that object. In a set amount of time when a 747 jet takes to travel its own length, a small propeller airplane has gone 7 to 10 times its own length. Therefore people have the misguided sense that the 747 jet goes awfully slow at landing, when in reality it goes faster than a small propeller airplane just about to land. Researches have found the same misguided judgment about the speed of an approaching train, simply due to the size/length of the train in question.

In driving, the same kind of illusion exists when a large moving object, a long tractor-trailer for example, is approaching from behind. Drivers oftentimes misjudged the speed of a big truck approaching from behind, especially when the drivers made that misjudgment from one of the three rearview mirrors, whose functions are limited by their blind spots. And often times, the misjudgment was made in a split second, as many other decisions made by a driver during the course of the driving.

By using a pseudo-car image ("PCI") logic, present invention incorporates the use of multiple cameras to produce a wide-angled view, while eliminating the illusion described previously, to enhance consumer safety.

BRIEF DESCRIPTION OF DRAWINGS

The accompanying drawings, which are incorporated in and constitute a part of this specification, illustrate the preferred embodiment of the invention and together with the description, serve to explain the principles of the invention.

A brief description of the drawings is as follows.

DETAILED DESCRIPTION

Figure 1:
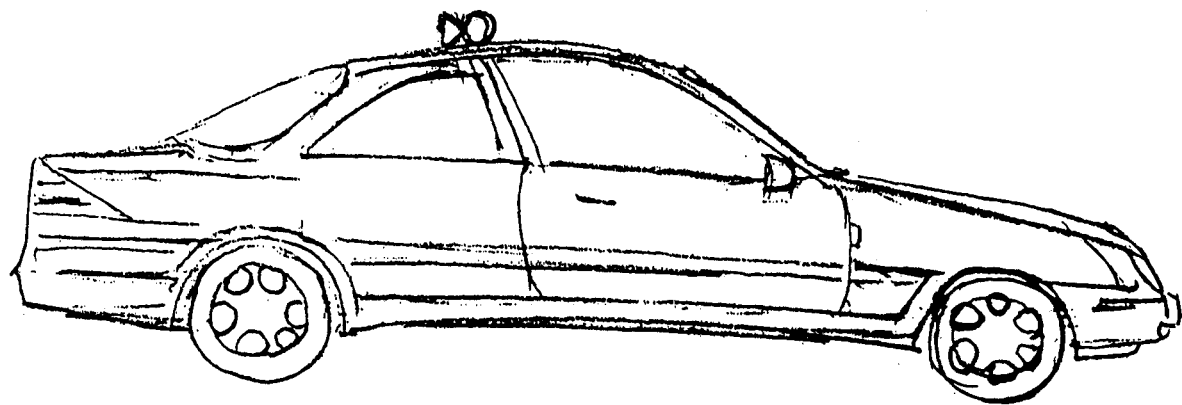
FIG. 1 shows the side view of multiple cameras installed on top of a vehicle, with cameras oriented to the rear and side(s) of the vehicle.

In FIG. 1, three cameras are mounted on top of a vehicle. This side view shows only the right and center camera.

Figure 2:
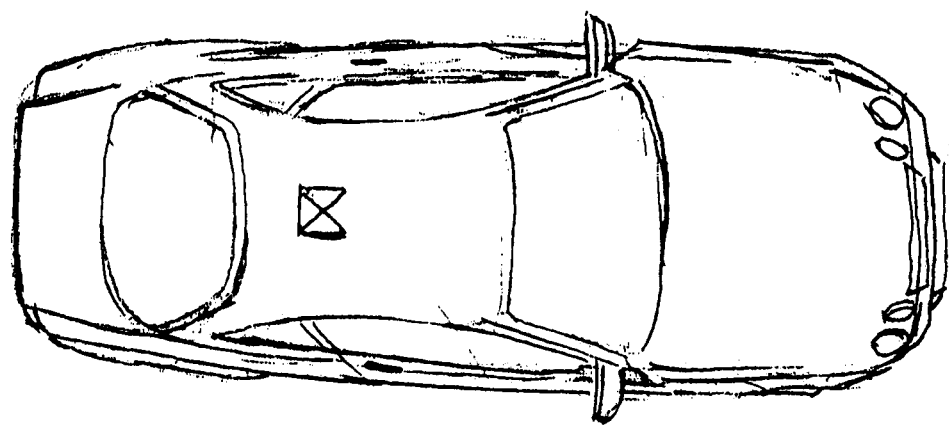
FIG. 2 shows the topdown view of multiple cameras installed on top of a vehicle, with cameras oriented to the rear and sides of the vehicle.

FIG. 2, top-down view of the three cameras are shown. Although present embodiment shows the cameras to be on top, they can be installed on brink of the trunk, or near the C-pillar of a vehicle, as long as the viewing angles are not obstructed by the positions of the installation.

Depending on how and where the cameras are mounted, a small motor may be added to the left or right camera so that when the driver engages the turn signal of the car, the left/right camera will turn a limited angle (10 degrees, for example) to widen the coverage area towards which the car is about to turn.

Figure 3:
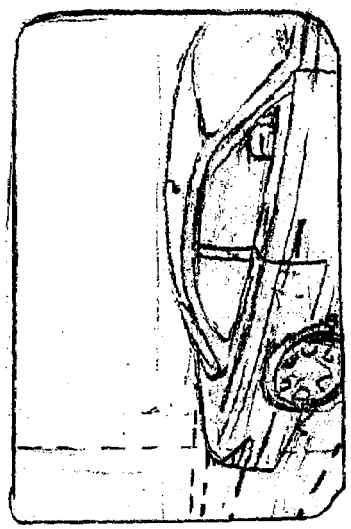
FIG. 3 shows images taken from multiple (3, in present example) cameras.
Figure 3:
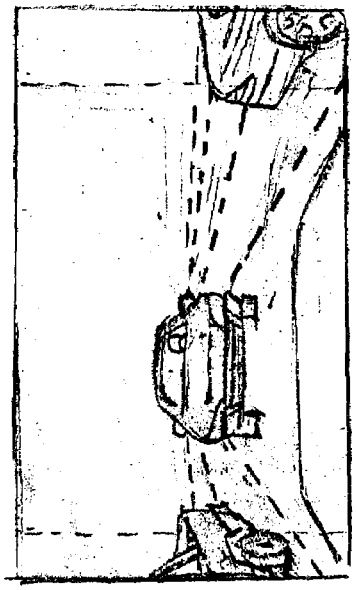
Figure 3:
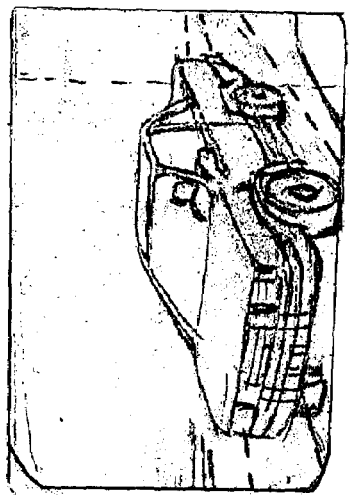

FIG. 3 shows 3 images taken from the 3 cameras, one from left camera, one from center camera, and one from right camera. Some portion of a vehicle will appear concurrently in two cameras. For example, to the left of the center image, there is a portion of a car that corresponding to the car in the left image. To the right of the center image, there is a portion of a car corresponding to the car in the right image.

Figure 4:
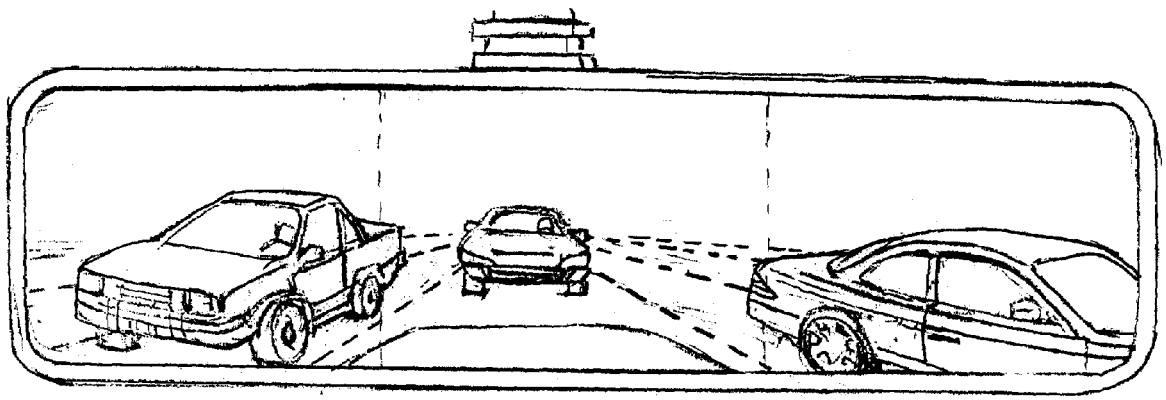
FIG. 4 shows the 3 separate images, after processing from image distribution unit ("IDU"), are integrated into one single view on a display monitor, as if viewed directly from human eyes.

FIG. 4 shows an image which covers a wide-angled view area and is the result of integration of images from multiple cameras, having processed by image distribution unit ("IDU") to combine the images.

Figure 5:
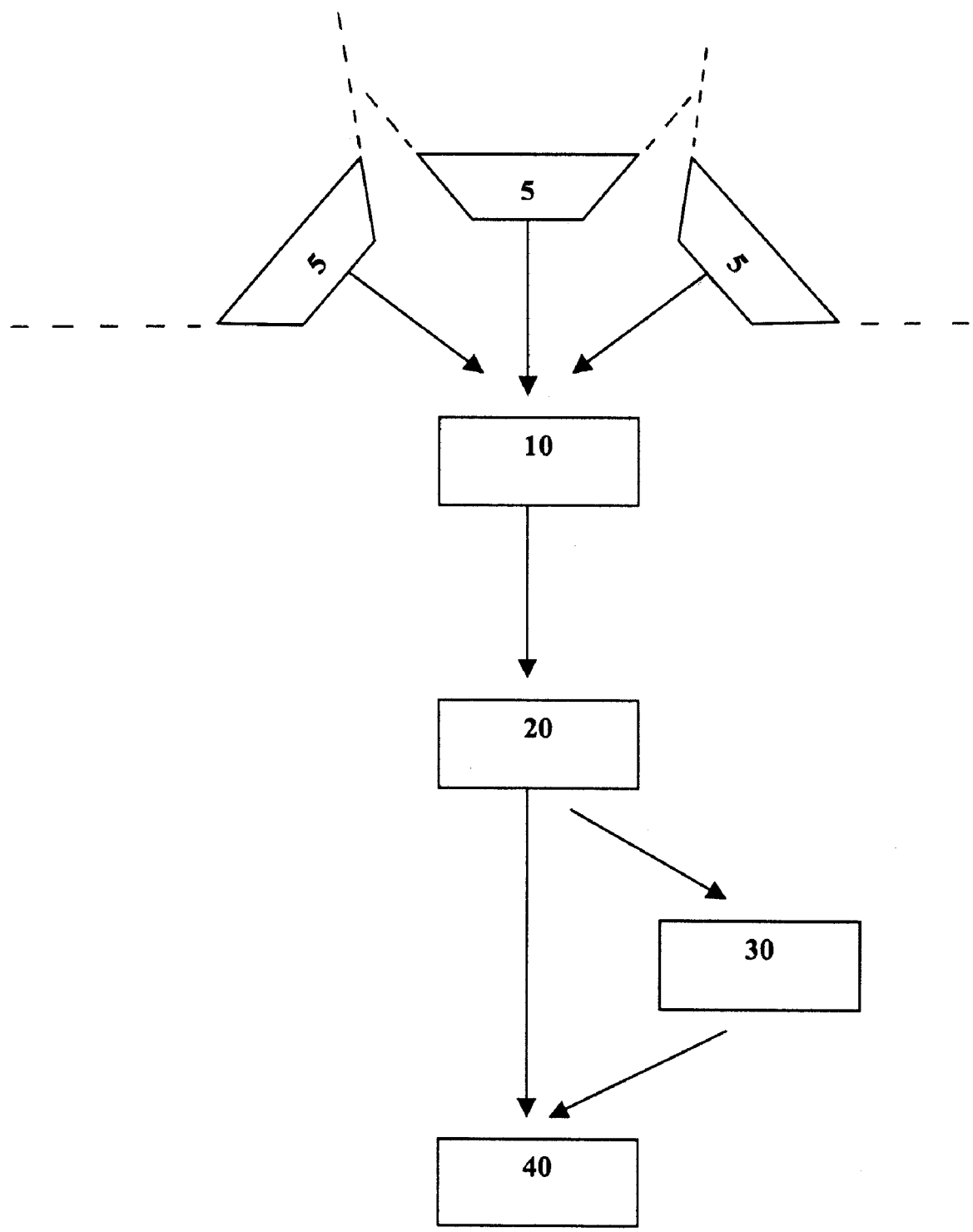
FIG. 5 shows the diagram of present invention, including 3 cameras, image distribution unit, recording unit, computer control unit and display unit.

FIG. 5 shows the block diagram of present invention. Three cameras are shown on top. Block 5 (3 of them) shows the cameras are positioned to cover wide angles, preferably about 180 degrees and there are overlapping angle coverage in between two adjacent cameras.

Block 10 is the image distribution unit (IDU) which combines images from separate cameras and produces an integrate view, as if seen from one single (wide-angled) camera without the distortion associated with a wide-angled camera.

Block 20 is a recording device, with enough memory to maintain at least 1 hour amount of images received from Block 10.

Block 40 is a display monitor, which can be a display screen on the dash board of a car, or it can be made to produce images projected on the center rear view mirror of a car.

Block 30 is the alternative image transformation computer control unit ("CCU") that employs the PCI logic to generate images of smaller vehicle, taking up same length of a large vehicle, but effectively eliminates the "slow-moving" illusion naturally associated with large vehicles.

Drivers will have the option (by a switch or a button) to activate the PCI program logic in CCU and then project the transformed image to display monitor 40.

Figure 6:
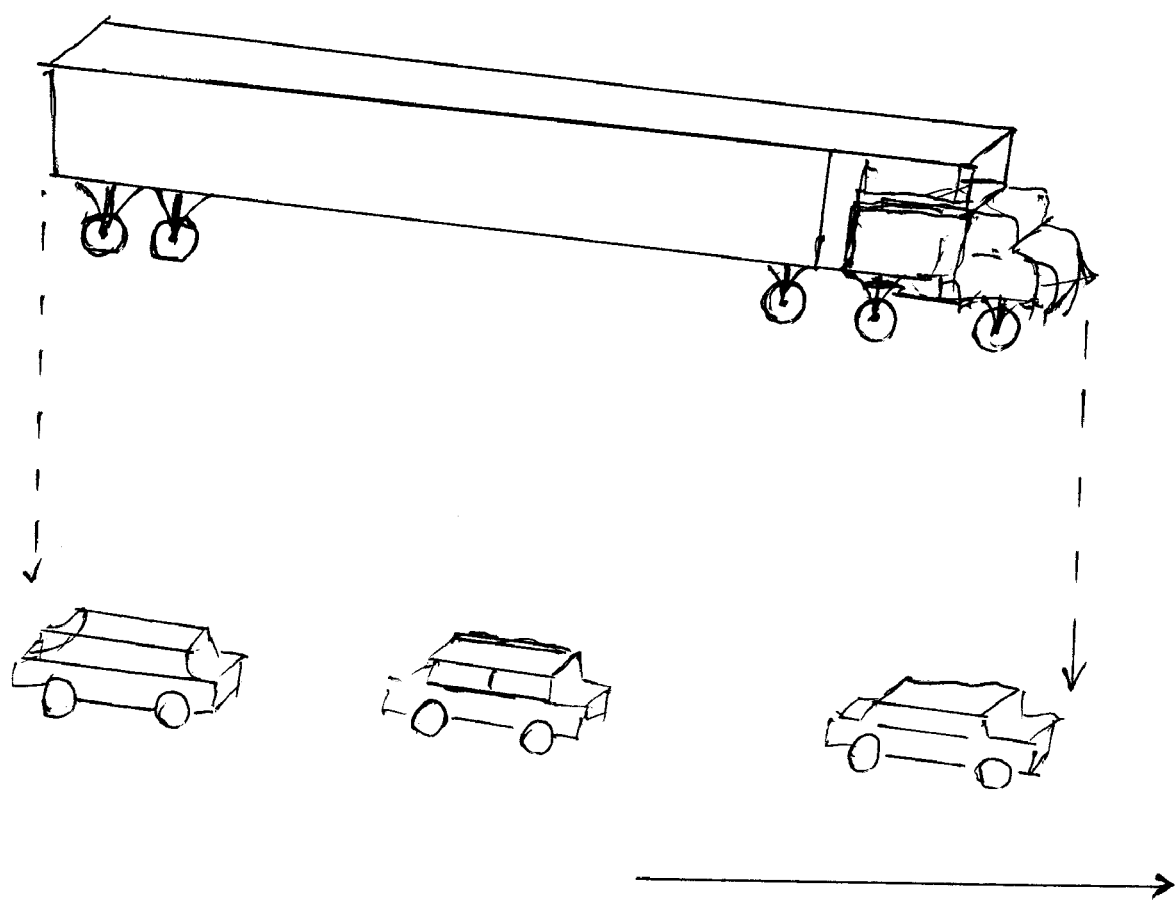
FIG. 6 shows the result of an image containing three PCIs, as transformed from its original tractor-trailer image.

FIG. 6 shows sample result of PCI program logic. A long tractor-trailer is transformed into three PCIs, evenly taking up the same length. Note that the PCI program logic will make sure that the gaps in between PCIs will be less than 15 feet, which is the length of a regular vehicle, so that drivers will not plan to squeeze into the gaps.

Note that recording device 20 records images before PCI image transformation done by CCU 30.

PCI program logic is defined herein. The algorithm can be implemented by any commercially available software tools, such as C++. Image distinction and recognition functions are currently very mature art and need no disclosure in, and are not claimed by, present invention.

The program logic for FIG. 6 is defined below.

PCI algorithm:

1. A pseudo-car image ("PCI") is defined to be the size of 15×5×5 (L×W×H, foot), with a generic shape of an automobile capable of being produced and projected to output devices, such as a monitor.

2. Current vehicle is defined to the car containing a computer control unit (CCU) that is loaded with the PCI program logic described herein.

3. PCI Program logic runs an infinite loop from step 4 to step 10.

4. From the feed-in source of images, capture the images of moving objects within a pre-set range (say 150 feet) and initiate images distinction/recognition functions.

5. If a moving object being recognized is determined to be longer than 35 feet but shorter than 50 feet, with its width/height to be around 5×5 or more, then two PCIs are produced to take up the whole length of the recognized object, with gap in between the two pseudo-car images, to output devices, such as a monitor.

6. If a moving object being recognized is determined to be longer than 50 feet but shorter than 65 feet, with its width/height to be around 5×5 or more, then three PCIs are produced to take up the whole length of the recognized object, with two gaps evenly filled in between the three PCIs, to output devices, such as a monitor.

7. If a moving object being recognized is determined to be longer than 65 feet but shorter than 80 feet, with its width/height to be around 5×5 or more, then four PCIs are produced to take up the whole length of the recognized object, with three gaps evenly filled in between the three PCIs, to output devices, such as a monitor.

8. If a moving object being recognized is determined to be long than 80 feet but shorter than 95 feet, with its width/height to be around 5×5 or more, then five PCIs are produced to take up the whole length of the recognized object, with four gaps evenly filled in between the three PCIS, to output devices such as a monitor.

9. If any gaps in between two PCIs are longer than 15 feet, than the images of two PCIs surrounding the gap will automatically extend towards each other to reduce the gap to no longer than 15 feet.

10. If the PCIs are approaching from behind current vehicle, the image production/transformation function stops when the front end of first PCI is flush with the tail end of current vehicle.

End of PCI program logic

Current PCI program logic only envisions a large vehicle of up to 95 feet. If additional PCI image transformation/production is needed due to vehicle of greater length, then additional step can be added in, increasing the distinction threadhold to 95/110 and 6 PCI images. And if even longer vehicle is possible, another notch of distinction can similarly be added to 110/125 and 7 PCI images.

Safety logics are built to the infinite program loop: gaps in between cars will be dynamically adjusted to be less than the length of a regular vehicle, so that driver in current vehicle would not plan to squeeze into the gap. PCI images will disappear once the front of first PCI image is flush with the tail end of current vehicle, so that true images of the large vehicle will appear and the illusion of slow-moving large objects from far distances will no long affect driver's judgment.

The invention claimed is:

1. A wide-angled image display system for automobiles, comprising:
    a. a plurality of cameras mounted on the rear and both sides of an automobile;
    b. a display monitor mounted on the inside of the automobile into the center rearview mirror so that the images received from said cameras are projected and superimposed on the mirror surface of the center rearview mirror;
    c. a control unit with image distributor that receives the images from said cameras and generates a composite wide-angled image on said display monitor; and,
    d. a set of program logic coded and loaded into the control unit, whereby said logic:
        transforms images of larger vehicles behind into images of smaller vehicles in tandem, taking up the same length as the larger vehicles, before transmitting to said display monitor, when images of the larger vehicles appear from the two sides to the rear of current vehicle,
        disables the transformation function of the larger image to smaller image when the front of that larger image is flush with the tail end of current vehicle, or if there is any portion of overlapping in the latitudinal direction.

* * * * *